(12) United States Patent
Alkhatib et al.

(10) Patent No.: US 9,569,985 B2
(45) Date of Patent: Feb. 14, 2017

(54) TRANSCATHETER HEART VALVE DELIVERY DEPLOYMENT SIMULATOR

(71) Applicant: St. Jude Medical, Cardiology Division, Inc., St. Paul, MN (US)

(72) Inventors: Yousef F. Alkhatib, Edina, MN (US); Theodore Paul Dale, Corcoran, MN (US); Aaron J. Chalekian, Savage, MN (US); James Leo Kurk, New Richmond, WI (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 819 days.

(21) Appl. No.: 13/797,157

(22) Filed: Mar. 12, 2013

(65) Prior Publication Data

US 2013/0295541 A1    Nov. 7, 2013

Related U.S. Application Data

(60) Provisional application No. 61/643,618, filed on May 7, 2012.

(51) Int. Cl.
*G09B 23/30* (2006.01)

(52) U.S. Cl.
CPC ............. *G09B 23/30* (2013.01); *G09B 23/303* (2013.01); *Y10T 29/49229* (2015.01)

(58) Field of Classification Search
USPC ................................. 434/262, 267, 268, 272
See application file for complete search history.

(56) References Cited

U.S. PATENT DOCUMENTS

| | | | |
|---|---|---|---|
| 5,425,644 A | 6/1995 | Szinicz | |
| 5,634,797 A | 6/1997 | Montgomery | |
| 5,947,744 A | 9/1999 | Izzat | |
| 6,790,043 B2 | 9/2004 | Aboud | |
| 7,018,327 B1 | 3/2006 | Conti | |
| 7,083,418 B2 | 8/2006 | Baldauf | |
| 8,678,830 B2 | 3/2014 | Gurdin et al. | |
| 8,926,333 B2 | 1/2015 | Vozenilek et al. | |
| 9,183,763 B2 | 11/2015 | Carson et al. | |
| 2007/0254273 A1* | 11/2007 | LaFrance | A61F 2/2472 434/272 |
| 2009/0246747 A1* | 10/2009 | Buckman, Jr. | G09B 23/30 434/272 |
| 2015/0161347 A1* | 6/2015 | Christiansen | G09B 23/303 703/9 |

* cited by examiner

*Primary Examiner* — James Hull
(74) *Attorney, Agent, or Firm* — Lerner, David, Littenberg, Krumholz & Mentlik, LLP (57) ABSTRACT

An apparatus for simulation of an anatomical structure may include a left ventricle component having an inlet port configured to receive fluid flow therethrough, an aortic arch component having an outlet port configured to receive fluid flow therethrough, an aortic annulus component attached to and disposed between the left ventricle component and the aortic arch component, and an introducer configured to receive an elongated catheter assembly therethrough. The aortic annulus component may have an inner surface including simulated stenotic nodules. The introducer may be in fluid communication with at least one of the left ventricle component and the aortic arch component.

7 Claims, 3 Drawing Sheets

TRANSCATHETER HEART VALVE DELIVERY DEPLOYMENT SIMULATOR

CROSS-REFERENCE TO RELATED APPLICATION

The present application claims the benefit of the filing date of U.S. Provisional Patent Application No. 61/643,618 filed May 7, 2012, the disclosure of which is hereby incorporated herein by reference.

BACKGROUND OF THE INVENTION

The present invention is related to prosthetic heart valve replacement, and more particularly to systems and methods for simulated deployment of prosthetic heart valves.

Prosthetic heart valves that are collapsible to a relatively small circumferential size can be delivered into a patient less invasively than valves that are not collapsible. For example, a collapsible valve may be delivered into a patient via a tube-like delivery apparatus such as a catheter, a trocar, a laparoscopic instrument, or the like. This collapsibility can avoid the need for a more invasive procedure such as full open-chest, open-heart surgery.

Collapsible prosthetic heart valves typically take the form of a valve structure mounted on a stent. There are two types of stents on which the valve structures are ordinarily mounted: a self-expanding stent and a balloon-expandable stent. To place such valves into a delivery apparatus and ultimately into a patient, the valve must first be collapsed or crimped to reduce its circumferential size.

When a collapsed prosthetic valve has reached the desired implant site in the patient (e.g., at or near the annulus of the patient's heart valve that is to be replaced by the prosthetic valve), the prosthetic valve can be deployed or released from the delivery apparatus and re-expanded to full operating size. For balloon-expandable valves, this generally involves releasing the entire valve, assuring its proper location, and then expanding a balloon positioned within the valve stent. For self-expanding valves, on the other hand, the stent automatically expands as the sheath covering the valve is withdrawn. Once a self-expanding valve has been fully deployed, it expands to a diameter larger than that of the sheath that previously contained the valve in the collapsed condition.

Designs of prosthetic heart valves may be tested in simulated environments (e.g., in large animals or in testing equipment) before the designs are used in human patients. Typically, aortic valves are tested in healthy tissue or similar environments, which may not accurately simulate the diseased tissue in which these heart valves are usually implanted in a human. A healthy tissue environment may be more or less resistant to radial expansion than a diseased human aorta, which may result in inaccuracies in the simulated deployment such as prosthetic heart valves migrating away from the installed location in a testing environment.

There therefore is a need for improvements to the devices, systems, and methods for simulated deployment of prosthetic heart valves. Among other advantages, the present invention may address one or more of these needs.

BRIEF SUMMARY OF THE INVENTION

An apparatus for simulation of an anatomical structure and methods of testing deployment of a prosthetic heart valve using same are aspects of the invention. In addition, any simulated environment having one or more of the following features and used in the simulation of an anatomical structure are the specific aspects of the invention.

An apparatus for simulation of an anatomical structure may include a left ventricle component having an inlet port configured to receive fluid flow therethrough, an aortic arch component having an outlet port configured to receive fluid flow therethrough, an aortic annulus component attached to and disposed between the left ventricle component and the aortic arch component, and an introducer configured to receive an elongated catheter assembly therethrough. The aortic annulus component may have an inner surface including simulated stenotic nodules. The introducer may be in fluid communication with at least one of the left ventricle component and the aortic arch component.

The left ventricle component may have an inner surface including topographical features configured to match the topography of an inner surface of a human left ventricle. The aortic arch component may have an inner surface including topographical features configured to match the topography of an inner surface of a human aortic arch. The aortic annulus component may be partially inserted into the aortic arch component. The left ventricle component, the aortic annulus component, and the aortic arch component may be portions of a unitary cardiovascular structure. The apparatus may also include a tissue lining overlying an inner surface of the outer wall of the cardiovascular structure. The tissue lining may overlie the inner surface of the aortic annulus component, and the simulated stenotic nodules may be attached to the inner surface of the outer wall and may form bumps in the surface of the tissue lining.

The introducer may be a first introducer in fluid communication with the left ventricle component. The apparatus may also include a second introducer in fluid communication with the aortic arch component. The aortic arch component may have an inner surface including topographical features configured to match the topography of an inner surface of a human aortic arch, and the second introducer may be located in a descending aorta portion of the aortic arch component. The apparatus may also include a third introducer in fluid communication with the aortic arch component and located at a position within the aortic arch component at which a brachiocephalic artery portion of the aortic arch component intersects an ascending aorta portion of the aortic arch component.

The apparatus may also include a liquid pumping system in fluid communication with the inlet port of the left ventricle component and the outlet port of the aortic arch component. The liquid pumping system may be configured to provide a pressurized liquid through the left ventricle component, the aortic annulus insert, and the aortic arch component. The liquid pumping system may be configured to provide high pressure liquid pulses into the inlet port of the left ventricle component and a back pressure into the outlet port of the aortic arch component. The back pressure may be less than the high pressure pulses.

A method of testing deployment of a prosthetic heart valve performing a CT scan of a human cardiovascular system including a portion of a human left ventricle, a human aortic annulus, and a human aortic arch, forming a cardiovascular structure modeled on the CT scan, the cardiovascular structure having a left ventricle component, an aortic annulus component, and an aortic arch component, and coupling a liquid pumping system to an inlet port of the left ventricle component and an outlet port of the aortic arch component. The method may also include pulsing a liquid from the liquid pumping system into the inlet port of the left ventricle component at a high pressure, and providing a back pressure of the liquid to the outlet port of the aortic arch component from the liquid pumping system, the back pressure being less than the high pressure. The method may also include inserting an elongated catheter assembly into at least one of the left ventricle component or the aortic arch component through an introducer, and deploying a valve into the aortic annulus component from the elongated catheter assembly.

The step of forming the cardiovascular structure may include separately forming the left ventricle component, the aortic annulus component, and the aortic arch component, and assembling the aortic annulus component between the left ventricle component and the aortic arch component. The step of forming the cardiovascular structure may include forming the aortic annulus component with an inner surface including topographical features configured to match the topography of an inner surface of the human aortic annulus. The step of forming the cardiovascular structure may include forming each of the left ventricle component and the aortic arch component with an inner surface including topographical features configured to match the topography of an inner surface of the human left ventricle and the human aortic arch, respectively.

The introducer may be in fluid communication with the aortic arch component. The catheter assembly may be inserted into the aortic annulus component through the aortic arch component. The valve may be deployed by sliding a sheath off of the valve in a proximal direction of the catheter assembly. The introducer may be in fluid communication with the left ventricle component. The catheter assembly may be inserted into the aortic annulus component through the left ventricle component. The valve may be deployed by sliding a sheath off of the valve in a distal direction of the catheter assembly.

The valve may be deployed into the aortic annulus component while the liquid is pulsing from the liquid pumping system into the inlet port of the left ventricle component. The back pressure may be provided from the liquid pumping system at a substantially constant pressure. The method may also include opening leaflets of the valve when the liquid is being pulsed into the inlet port of the left ventricle component and closing the leaflets of the valve when the liquid is not being pulsed.

BRIEF DESCRIPTION OF THE DRAWINGS

Various embodiments of the present invention will now be described with reference to the appended drawings. It is to be appreciated that these drawings depict only some embodiments of the invention and are therefore not to be considered limiting of its scope.

DETAILED DESCRIPTION

As used herein, the terms "proximal" and "distal" are to be taken as relative to a user using the disclosed delivery devices. "Proximal" is to be understood as relatively close to the user and "distal" is to be understood as relatively farther away from the user.

Figure 1A:
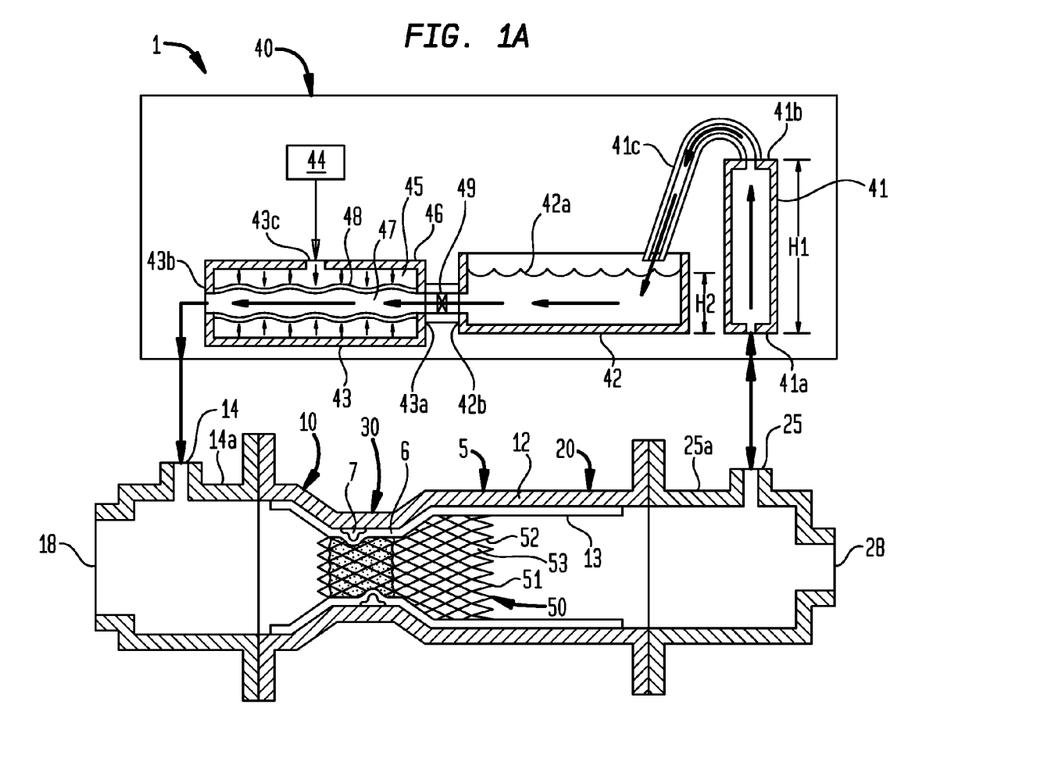
FIG. 1A is a diagrammatic side sectional view of a portion of a simulated deployment environment for a collapsible prosthetic heart valve, shown with a collapsible prosthetic valve installed therein.
Figure 1B:
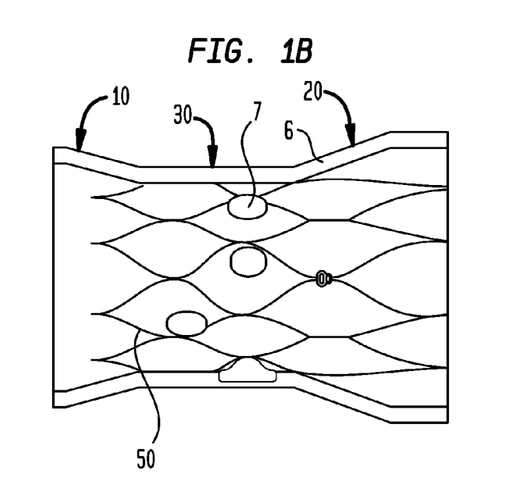
FIG. 1B is an enlarged side view of the aortic annulus assembly of FIG. 1A.
Figure 1C:
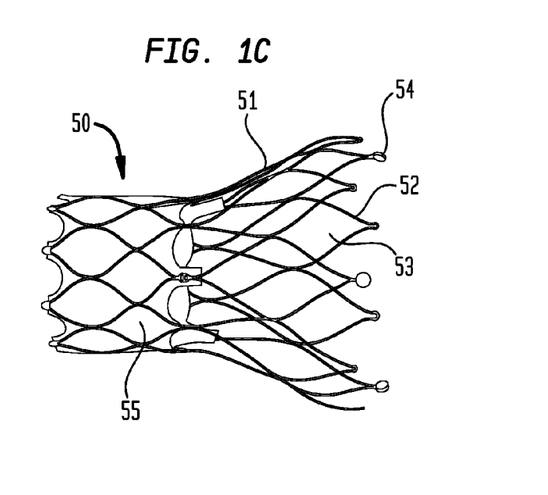
FIG. 1C is a side view of a collapsible prosthetic heart valve that can be installed into the simulated deployment apparatus of FIG. 1A.

Referring now to FIGS. 1A-1C to illustrate the structure and function of the present invention, an exemplary deployment simulation apparatus 1 according to a first embodiment may include a simulated cardiovascular structure 5 having a left ventricle 10, an aortic arch 20, an aortic annulus 30 disposed between the left ventricle and the aortic arch, and a pumping system 40 to provide fluid flow through the simulated cardiovascular structure. The left ventricle 10 and the aortic arch 20 may each taper from a larger diameter remote from the aortic annulus 30 to a smaller diameter at the aortic annulus. The cardiovascular structure 5 is adapted to receive a collapsible prosthetic heart valve 50 therein, delivered, for example, by a device such as a transfemoral delivery device 210 (FIG. 3) or a transapical delivery device 210' (FIG. 4).

The left ventricle 10, the aortic arch 20, and the aortic annulus 30 all may be partially modeled on computed tomography scans ("CT scans") of an actual human cardiovascular system, or may be modeled to approximate the dimensions of the cardiovascular system of humans at particular percentile ranges for which testing is desired (e.g., $5^{th}$ percentile and $95^{th}$ percentile aortic annulus diameters seen in humans). The simulation apparatus 1 may be used to train users such as surgeons to deploy the prosthetic heart valve 50 into a patient's native aortic annulus. The simulation apparatus 1 may also be used for deployment testing and/or performance testing of various designs of heart valves 50 in modeled cardiovascular systems having various sizes and configurations (e.g., the diameter of the aortic annulus, the angles of the aortic arch and the left ventricle relative to one another, etc). The simulation apparatus 1 may be used to model other anatomical structures, for example, such as modeling a carotid artery for training and/or testing of delivery of a collapsible stent therein.

The cardiovascular structure 5 may be made of a compliant polymer such as silicone, and the outer walls 12 of the cardiovascular structure may have a thickness of approximately ⅛". The outer walls 12 of the cardiovascular structure 5 may be optionally lined with tissue 6 (e.g., bovine pericardium tissue) to mimic the tissue contact friction between the valve 50 and the cardiovascular structure typically seen in a human patient, as well as to mimic the lubrication of the cardiovascular structure typically seen in a human patient so the delivery devices 210 and/or 210' can deliver the valve to the an aortic annulus 30 without binding against the outer walls of the cardiovascular structure.

An inner surface 13 of the tissue 6 may include topographical features such as simulated calcium nodules or stenotic nodules 7. As shown in FIG. 1B, the stenotic nodules 7 may be located only within the aortic annulus 30, but in other embodiments, the stenotic nodules or other topographical features may be located within any or all of the left ventricle 10, the aortic arch 20, and the aortic annulus.

The stenotic nodules 7 may be molded into the outer walls 12, such that the nodules create protrusions in the inner surface 13 of the tissue 6. The stenotic nodules 7 may alternatively be discrete inserts, made of silicone or a hard plastic, for example, that are attached either to the outer walls 12 or the inner surface 13 of the tissue 6. Such topographical features may provide partial obstructions around which a delivery device such as the transapical delivery device 210' must be navigated when the prosthetic heart valve 50 is being deployed.

Such stenotic nodules 7 may increase the friction and engagement between the prosthetic heart valve 50 and the inner surface 13 of the tissue 6. Although the contour of the inner surface 13 of the tissue 6 may not be based on a patient's CT scan, the aortic annulus 30 may be configured such that the inner diameter thereof approximately matches the inner diameter of the patient's native aortic annulus or the portion of the aortic arch 20 adjacent the patient's native aortic annulus.

If the tissue 6 is not included in the cardiovascular structure 5, the outer walls 12 may be coated with a lubricant such as paraline (not shown) that may reduce the friction between the outer walls and the delivery devices 210 and/or 210' to mimic the lubrication of the cardiovascular structure typically seen in a human patient. Such a lubricant coating may have a thickness of approximately 0.001".

The cardiovascular structure 5 may have an inlet port 14 that is configured to receive fluid flow therethrough from the pumping system 40. The left ventricle 10 may have an introducer 18 configured to receive the transapical delivery device 210' therethrough, and the introducer may include a hemostatic valve (not shown) configured to create a seal around the delivery device while it extends within the left ventricle. The inlet port 14 and the introducer 18 may be integrally formed with the left ventricle 10, or alternatively, the inlet port and/or the introducer may be provided in an inlet component 14a that may be attached to the left ventricle.

The cardiovascular structure 5 may also have an outlet port 25 that is configured to receive fluid flow therethrough both from and to the pumping system 40, as will be explained below. The aortic arch 20 may have an introducer 28 configured to receive the transfemoral delivery device 210 therethrough, and the introducer may include a hemostatic valve (not shown) configured to create a seal around the delivery device while it extends within the aortic arch. The outlet port 25 and the introducer 28 may be integrally formed with the aortic arch 20, or alternatively, the outlet port and/or the introducer may be provided in an outlet component 25a that may be attached to the aortic arch.

The collapsible prosthetic heart valve 50 may have a stent portion 51 that includes a plurality of stent struts 52 that define cells 53 therebetween. At least one retention member 54 (FIG. 1C) may extend from an end of the stent portion 51. The valve 50 may also have a valve portion 55 stitched or otherwise attached to the stent portion 51. The stent portion 51 may be made from a memory material such as nitinol, such that the prosthetic heart valve 50 has a bias towards the expanded condition shown in FIG. 1C. The prosthetic heart valve 50 may be radially compressed into a compressed condition having a smaller diameter for delivery into a patient or into the cardiovascular structure 5 through an introducer (e.g., the introducer 18 or 28), as described below with respect to FIGS. 3 and 4.

The collapsible prosthetic heart valve 50 may be configured to be deployed within a patient at the native aortic annulus, or within the simulated cardiovascular structure 5 within the aortic annulus 30. It is desirable that the valve 50 be deployed within the aortic annulus 30 with the valve portion 55 positioned within the aortic annulus 30 and the stent portion 51 extending into the aortic arch 20.

The collapsible prosthetic heart valve 50 may be configured to the particular anatomical structure of the native aortic annulus and aortic arch of a patient, or to the particular anatomical structure of the aortic annulus 30 and aortic arch 20 of the patient of which a CT scan was taken or of which the cardiovascular structure 5 was designed to simulate. For example, if the patient on which the cardiovascular structure 5 was modeled has a native aortic annulus with a large inner diameter, prosthetic heart valve 50 having a large expanded radial diameter may be used. On the other hand, if the patient on which the cardiovascular structure 5 was modeled has a native aortic annulus with a small inner diameter, a prosthetic heart valve 50 having a small expanded radial diameter may be used.

The pumping system 40 may be configured to pump a liquid (e.g., saline) through the cardiovascular structure 5 to simulate blood flowing through the valve 50. The liquid may be pumped from the pumping system 40, into the left ventricle 10, then into the aortic annulus 30, then into the aortic arch 20, and then back to the pumping system through the outlet port 25. The pumping system 40 may be configured to alternatingly provide: (i) a high pressure liquid pulse (e.g., 190 mmHg) into the left ventricle 10 at the inlet port 14 to open the valve 50, and (ii) a back pressure (e.g., 90 mmHg) into the aortic arch 20 at the outlet port 25 to close the valve.

The pumping system 40 may be a partially closed recirculating liquid flow system, and may include a low pressure chamber 41, an open liquid tank 42, a high pressure chamber 43, and a gas pulse generator 44.

The low pressure chamber 41 may be in the form of a vertically oriented tank (e.g., a cylindrical tube) that is adapted to have a top liquid surface near the outlet 41b that is at a height H1 above the inlet 41a. The back pressure provided at the outlet 25 of the cardiovascular structure 5 is linearly related to the column height of the liquid in the low pressure chamber 41 relative to the outlet 25. Therefore, the low pressure chamber 41 can made to provide a desired back pressure (e.g., 90 mmHg) by raising or lowering the outlet 41b of the low pressure chamber relative to the outlet 25 of the cardiovascular structure 5 until the desired back pressure is achieved. A downspout 41c of the low pressure chamber 41 has an upper end connected to the outlet 41b, and a lower end located in the open liquid tank 42, such that any liquid that rises above the outlet 41b will flow through the downspout into the open liquid tank, thereby maintaining a constant back pressure at outlet 25 of the cardiovascular structure 5.

The open liquid tank 42 may be in the form of a horizontally oriented tank that is adapted to have a top liquid surface 42a that is at a height H2 above the outlet 42b. The pressure provided at the outlet 42b of the open liquid tank 42 is linearly related to the height of the liquid relative to the outlet 42b. The open liquid tank 42 is configured such that liquid flowing from the low pressure chamber 41 into the open liquid tank does not substantially change the height H2, because the horizontal orientation of the open liquid tank spreads the volume of additional liquid over a large area of the surface 42a. The pumping system is configured so that the liquid surface 42a is at a lower height than the outlet 41b of the low pressure chamber 41. The open liquid tank 42 may be heated to approximately 98° F., so that when the liquid is pumped into the cardiovascular structure 5, the cardiovascular structure will have approximately the same temperature as a cardiovascular structure in a live human patient.

The high pressure chamber 43 may include an outer chamber 45 surrounded by a rigid outer wall 46, and an inner chamber 47 surrounded by a compliant tube 48 made of a silicon elastomer, for example. A liquid inlet 43a of the high pressure chamber 43 may be in fluid communication with the inner chamber 47, and may be in one-way fluid communication with the outlet 42b of the open liquid tank 42 via a one-way valve 49 between the inlet 43a and the outlet 42b. A liquid outlet 43b of the high pressure chamber 43 may be in fluid communication with the inner chamber 47, and with the inlet 14 of the cardiovascular structure 5. A gas inlet 43c of the high pressure chamber 43 may be in fluid communication with the outer chamber 45, and may be in fluid communication with the gas pulse generator 44. The pumping system is configured so that the highest point of the liquid in the compliant tube 48 is at a lower height than the liquid surface 42a of the open liquid tank 42.

In use, the pumping system 40 may be configured to pump fluid through the cardiovascular structure 5 at approximately 70 beats or pulses per minute, providing approximately 5.0 liters of liquid per minute into the left ventricle 10 through the inlet port 14, with approximately 100 mmHg mean pressure across the valve 50.

Initially, the valve 50 is closed, because the outer chamber 45 of the high pressure chamber 43 is not pressurized, and because the liquid surface 42a of the open liquid tank 42 is at a lower height than the outlet 41b of the low pressure chamber 41, so the back pressure in the aortic arch 20 (e.g., 90 mmHg) exceeds the pressure of the left ventricle 10 (e.g., 30 mmHg).

To generate a high-pressure liquid pulse (e.g., 190 mmHg) into the inlet 14 of the cardiovascular structure 5, the gas pulse generator 44 may force a pressurized gas pulse into the gas inlet 43c of the high pressure chamber. Since the gas inlet 43c is in fluid communication with the outer surface of the compliant tube 48, a pulse of pressurized gas entering the outer chamber 45 will squeeze the outer surface of the compliant tube, thereby sharply raising the pressure of the liquid in the inner chamber 47. When the pressure of the liquid in the inner chamber 47 is raised above the pressure at the outlet 42a of the open fluid tank 42, the one-way valve 49 will close, so the pressurized liquid within the inner chamber 47 will be forced to flow out of the liquid outlet 43b of the high pressure chamber 43 and into the inlet 14 of the cardiovascular structure 5.

When the liquid pressure of the left ventricle 10 is raised above the back pressure provided to the aortic arch 20, the valve 50 will open, and the pulse of liquid will flow through the valve from the left ventricle to the aortic arch. The volume of liquid that is pulsed through the valve 50 will push an equal volume of liquid through the low pressure chamber 41, which will flow into the open fluid tank 42, thereby maintaining a constant back pressure applied to the aortic arch 20.

When the gas pulse generator 44 ceases providing the gas pulse, the pressure in the inner chamber 47 of the high pressure chamber 43 will drop below the level of pressure provided to the one-way valve 49, because the highest point of the liquid in the compliant tube 48 is at a lower height than the liquid surface 42a of the open liquid tank 42, so the one-way valve 49 will open. When the one-way valve 49 opens, the pressure provided to the left ventricle 10 will again be based on the height of the liquid surface 42a of the open liquid tank 42 (e.g., 30 mmHg). Since the liquid pressure in the left ventricle 10 has dropped below the back pressure provided to the aortic arch 20 (e.g., 90 mmHg), the valve 50 will close. This completes one complete open and close cycle of the valve 50. For additional open and close cycles of the valve 50, the gas pulse generator 44 can provide additional gas pulses to the inner chamber 47 of the high pressure chamber 43, and the process described above will be repeated.

Figure 2A:
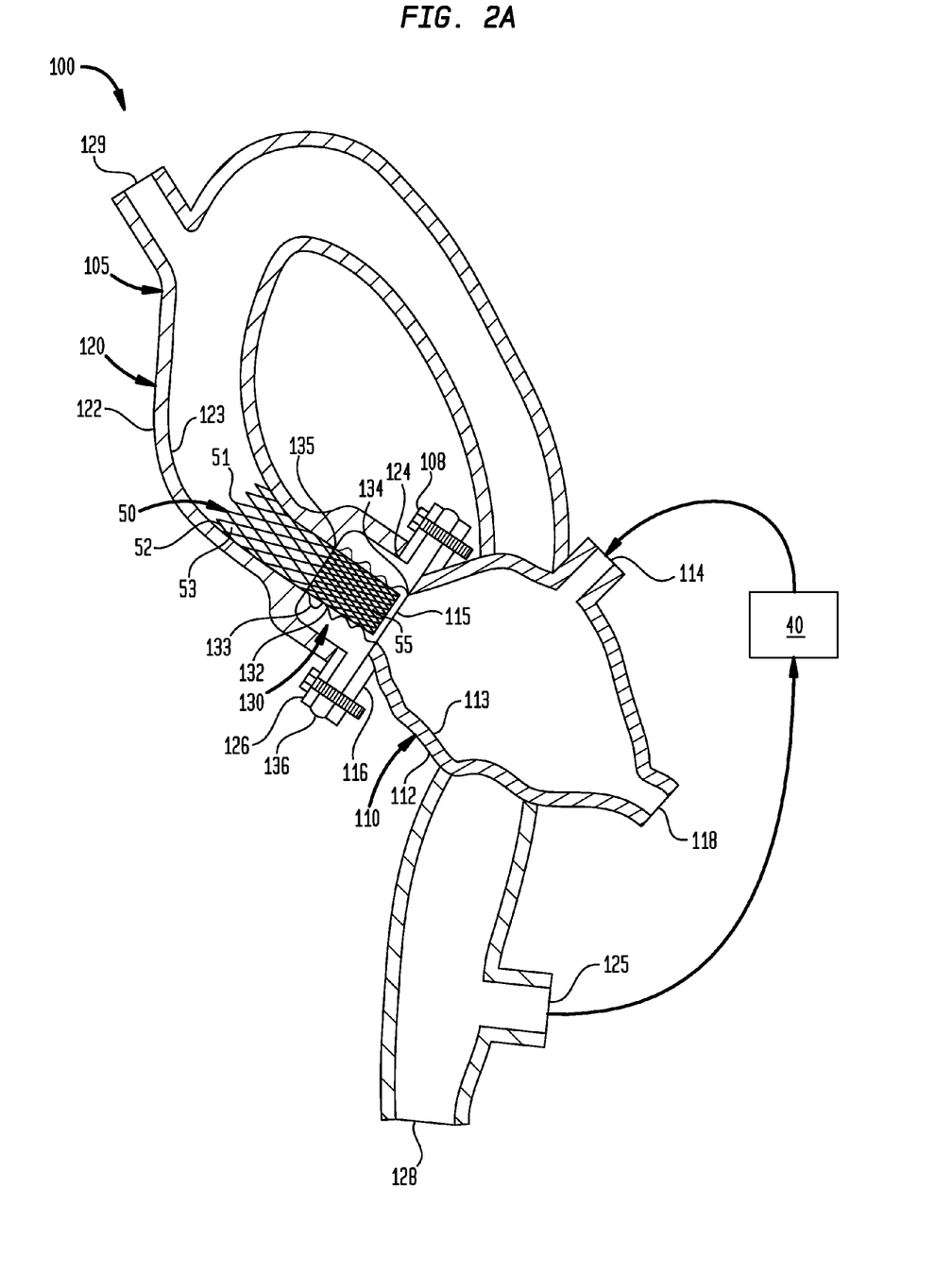
FIG. 2A is a diagrammatic side sectional view of a portion of another simulated deployment environment for a collapsible prosthetic heart valve, shown with a collapsible prosthetic valve installed therein.
Figure 2B:
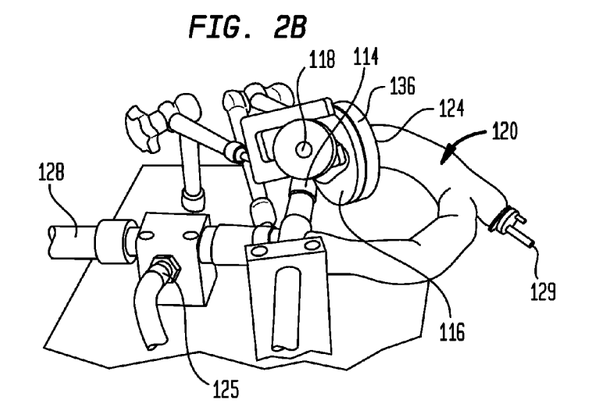
FIG. 2B is a perspective of the aortic arch assembly of FIG. 2A.
Figure 2C:
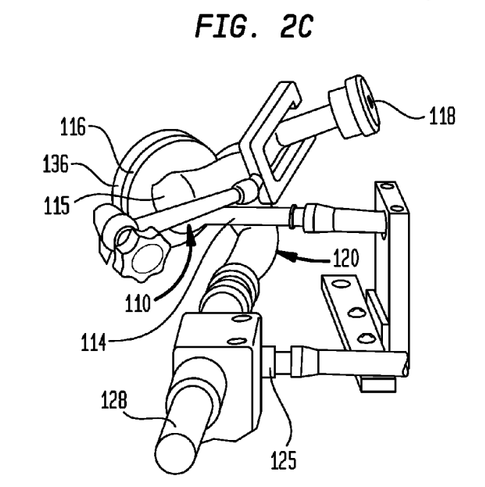
FIG. 2C is a perspective view of the left ventricle assembly of FIG. 2A.

Referring now to FIGS. 2A-2C, an exemplary deployment simulation apparatus 100 according to a second embodiment may include a simulated cardiovascular structure 105 having a left ventricle 110, an aortic arch 120, and an aortic annulus 130 assembled between the left ventricle and the aortic arch. The deployment simulation apparatus 100 may include the pumping system 40 described above to provide fluid flow through the cardiovascular structure 105. The cardiovascular structure 105 is adapted to receive a collapsible prosthetic heart valve 50 therein, delivered, for example, by a device such as a transfemoral delivery device 210 (FIG. 3) or a transapical delivery device 210' (FIG. 4).

The left ventricle 110, the aortic arch 120, and the aortic annulus 130 of the cardiovascular structure 105 all may be partially or fully modeled on computed tomography scans ("CT scans") of an actual human cardiovascular system. The simulation apparatus 100 may be used to train users such as surgeons to deploy the prosthetic heart valve 50 into a patient's native aortic annulus. The simulation apparatus 100 may also be used for deployment testing and/or performance testing of various designs of heart valves 50 in modeled cardiovascular systems having various sizes and configurations (e.g., the shape of the aortic arch, the diameter of the aortic annulus, the angles of the aortic arch and the left ventricle relative to one another, etc). The simulation apparatus 100 may be used to model other anatomical structures, for example, such as modeling a carotid artery for training and/or testing of delivery of a collapsible stent therein.

The left ventricle 110 as noted may be an anatomical model of a portion of a human heart that may be based on a three-dimensional CT scan of a human heart. The human heart on which the left ventricle 110 is based may be from a live person or a cadaver. The left ventricle 110 may be made of a compliant polymer such as silicone, and the outer walls 112 of the left ventricle may have a thickness of approximately ⅛".

An inner surface 113 of the outer walls 112 may include topographical features such as papillary muscles (not shown). Such topographical features may provide partial obstructions around which a delivery device such as the transapical delivery device 210' must be navigated when the prosthetic heart valve 50 is being deployed. The inner surface 113 of the outer walls 112 may be coated with a lubricant such as paraline (not shown) that may reduce the friction between the inner surface of the outer walls and the transapical delivery device 210'. Such a lubricant coating may have a thickness of approximately 0.001".

The left ventricle 110 may have an inlet port 114 that is configured to receive fluid flow therethrough from the pumping system 40. The left ventricle 110 may have an outlet port 115 that is configured to receive fluid flow therethrough into the aortic annulus 130 and the aortic arch 120. The outlet port 115 may be attached to a ventricle flange 116 that is configured to be coupled to a corresponding opposing aorta flange 126 that is attached to the aortic arch 120 adjacent the aortic annulus 130. The coupling of the flanges 116 and 126 may be via bolts 108 extending through each of the flanges, for example, or via a clamping mechanism (not shown). The flanges 116 and 126 may each have a washer-like shape that extends around the periphery of the outlet port 115 of the left ventricle 110 and the inlet port 124 of the aortic arch 120, respectively.

The left ventricle 110 may have an introducer 118 located at the left ventricular apex of the heart. The introducer 118 may be configured to receive the transapical delivery device 210' therethrough, and the introducer may include a hemostatic valve (not shown) configured to create a seal around the delivery device while it extends within the left ventricle.

The aortic arch 120 may be an anatomical model of a portion of a human aortic arch that may be based on a three-dimensional CT scan of a human heart. The human aortic arch on which the aortic arch 120 is based may be from a live person or a cadaver. Similar to the left ventricle 110, the aortic arch 120 may be made of a compliant polymer such as silicone, and the outer walls 122 of the aortic arch may have a thickness of approximately ⅛".

Similar to the left ventricle 110, an inner surface 123 of the outer walls 122 may include topographical features (not shown). Such topographical features may provide partial obstructions around which a delivery device such as the transfemoral delivery device 210 or a subclavian delivery device (not shown) must be navigated when the prosthetic heart valve 50 is being deployed. The inner surface 123 of the outer walls 122 may be coated with a lubricant such as paraline (not shown) that may reduce the friction between the inner surface of the outer walls and the delivery devices 210 and/or 210' to mimic the lubrication of the cardiovascular structure typically seen in a human patient. Such a lubricant coating may have a thickness of approximately 0.001".

The inlet port 124 of the aortic arch 120 may be configured to receive fluid flow therethrough into the aortic annulus 130 from the left ventricle 110. The inlet port 124 may be attached to the aorta flange 126 that is configured to attach to the corresponding ventricle flange 116. The aorta flange 126 may have a washer-like shape that extends around the periphery of the inlet port 124. The aortic arch 120 may have an outlet port 125 that is configured to receive fluid flow therethrough to the pumping system 40.

The aortic arch 120 may have an introducer 128 located at an end of the descending portion of the aortic arch. The introducer 128 may simulate an opening in the femoral artery of a patient into which the transfemoral delivery device 210 may be inserted to deploy the prosthetic heart valve 50. The introducer 128 may be configured to receive the transfemoral delivery device 10 therethrough, and may include a hemostatic valve (not shown) configured to create a seal around the delivery device while it extends within the aortic arch.

The aortic arch 120 may have another introducer 129 located at a position within the aortic arch at which the brachiocephalic artery intersects the aortic arch, for example. The introducer 129 may simulate an opening in the right subclavian artery of a patient into which a subclavian delivery device or the transfemoral delivery device 210 may be inserted to deploy the prosthetic heart valve 50. The introducer 129 may be configured to receive a prosthetic valve delivery device therethrough, and may include a hemostatic valve (not shown) configured to create a seal around the delivery device while it extends within the aortic arch.

The aortic annulus 130 may be a model of a human aortic annulus. The aortic annulus 130 may be made of a polymer that is produced by stereolithography ("SLA"). The aortic annulus 130 may be more resistant to radial expansion than the portion of the aortic arch 120 adjacent the inlet port 124, so that the increased resistance to radial expansion of a stenosed human aortic annulus relative to the more flexible aortic arch can be modeled. An inner surface 133 of the aortic annulus 130 may include topographical features such as stenotic nodules 132. Such stenotic nodules 132 may increase the friction and engagement between the prosthetic heart valve 50 and the inner surface 133 of the aortic annulus 130. Although the contour of the inner surface 133 of the aortic annulus 130 may not be based on a patient's CT scan, the aortic annulus 130 may be configured such that the inner diameter thereof approximately matches the inner diameter of the patient's native aortic annulus or the portion of the aortic arch 120 adjacent the patient's native aortic annulus.

The aortic annulus 130 may be assembled between the left ventricle 110 and the aortic arch 120. The aortic annulus 130 may have an inlet end 134 that is configured to receive fluid flow from the left ventricle 110 and an outlet end 135 that is configured to provide an opening into the aortic arch 120. The inlet end 134 may have a flange 136 that is configured to attach between the ventricle flange 116 of the left ventricle 110 and the aorta flange 126 of the aortic arch 120.

The aortic outlet end 135 of the aortic annulus 130 may be configured to extend into the inlet port 124 of the aortic arch 120 with a friction fit or press fit connection. There may be a relatively smooth transition between the inner diameter of the aortic annulus 130 and the inner diameter of the aortic arch 120 at the location where the inner wall 133 of the aortic annulus meets the inner wall 123 of the aortic arch.

The collapsible prosthetic heart valve 50 may be configured to the particular anatomical structure of the native aortic annulus and aortic arch of a patient, or to the particular anatomical structure of the aortic annulus 130 and aortic arch 120 of the patient of which the CT scan was taken. For example, if the patient on which the apparatus 100 was modeled has a native aortic annulus with a large inner diameter, prosthetic heart valve 50 having a large expanded radial diameter may be used. On the other hand, if the patient on which the apparatus 100 was modeled has a native aortic annulus with a small inner diameter, prosthetic heart valve 50 having a small expanded radial diameter may be used.

The pumping system 40 may be configured to provide liquid flow through the cardiovascular structure 105, in the same manner as described above with reference to the first embodiment shown in FIGS. 1A-1C. The liquid may be pumped from the pumping system 40, into the left ventricle 110 through the inlet port 114, then into the aortic annulus 130, then into the aortic arch 120, and then back to the pumping system through the outlet port 125.

Figure 3:
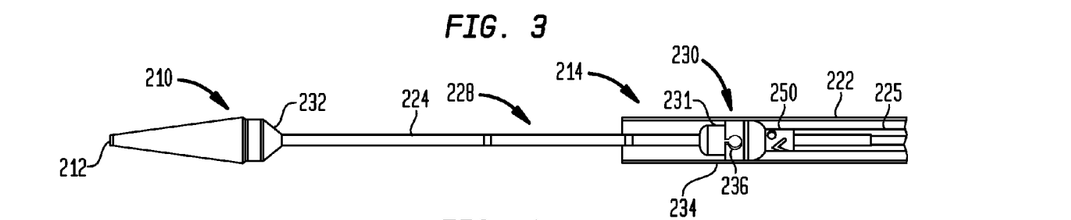
FIG. 3 is a side view of a delivery device for transfemoral or subclavian deployment of a collapsible prosthetic heart valve.
Figure 4:
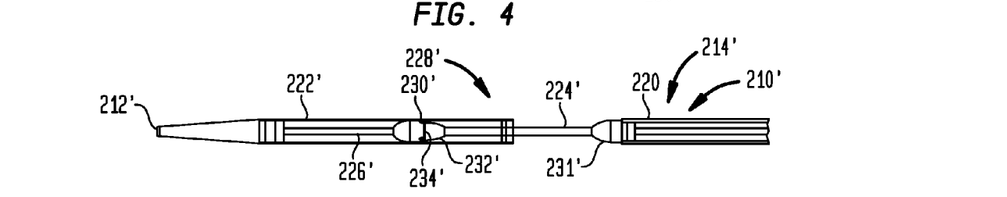
FIG. 4 is a side view of a delivery device for transapical deployment of a collapsible prosthetic heart valve.

Referring now to FIG. 3, an exemplary transfemoral delivery device 210 that may be used to deploy the collapsible prosthetic heart valve 50 into the apparatus 1 or the apparatus 100 described above using the respective transfemoral inlet port 28 or 128 will be described. The delivery device 210 or a device similar to the delivery device 210 may alternatively be used to deploy the collapsible prosthetic heart valve 50 into the apparatus 100 using the subclavian inlet port 129.

The delivery device 210 has a distal tip 212 and a catheter assembly 214 extending from the distal tip to a proximal end (not shown) that includes a handle (not shown) for a user to control the delivery device 210. Examples of handles that can be used to control deployment of the delivery device 210 are shown and described in U.S. Patent Application Publication No. 2012/0123528, the disclosure of which is hereby incorporated by reference herein.

The catheter assembly 214 includes a distal sheath 222 extending from the handle towards the distal tip 212, a hollow inner shaft 224 located inside of the distal sheath and extending from the handle to the distal tip, and a valve receiving compartment 228. The valve receiving compartment 228 is configured to receive the collapsible prosthetic heart valve 50 or another implantable device for delivery inside of the apparatus 1 or 100.

The proximal end of the valve receiving compartment 228 is defined by a retainer 230 located, in this embodiment, inside the distal sheath 222. A proximal conical end 231 is provided adjacent the retainer 230, also inside the valve receiving compartment 228, and a distal conical end 232 is provided spaced from the retainer 230 and adjacent the distal tip 212. The conical end 232 is joined to the inner shaft 224 at the distal end of the valve receiving compartment 228, and the conical end 231 and the retainer 230 are joined to a stiffening member 225 mounted on the inner shaft 224 at the proximal end of the valve receiving compartment 228 within the distal sheath 222. The inner shaft 224 and the stiffening member 225 may have the same internal diameter, adapted to receive a guide wire (not shown). Alternatively, in any of the delivery device embodiments described herein, the inner shaft 224 and the stiffening member 225 may be a single unitary shaft.

The retainer 230 may include one or more recesses 236, each recess being located at or adjacent a retention edge 234 of the retainer and being configured to receive a corresponding retention member 54 of the stent portion 51 of the collapsible valve 50. For delivery into the apparatus 1 or 100, the collapsible valve 50 is loaded into the valve receiving compartment 228 around the inner shaft 224 and between conical ends 231 and 232, and the stent portion 51 of the valve is coupled to the retainer 230 within the distal sheath 222 while placing at least one retention member 54 into at least one recess 236.

Each recess 236 may have a similar shape and a slightly larger size than the stent retention member 54 so as to capture same readily, but with only a small amount of relief therebetween. Forming recesses 236 with an appropriate shape and size may prevent longitudinal movement of the valve within the valve the receiving compartment 228, such as during deployment or resheathing procedures. In this regard, the recesses 236 may have a keyhole shape.

In a particular embodiment, one or more components of the delivery device 210 may be made of one or more echogenic materials, so that the catheter assembly 214 may be more easily visualized inside of the apparatus 1 or 100 using three-dimensional echocardiography.

To load the delivery device 210 with a collapsible prosthetic valve 50, a user attaches the stent portion 51 of the prosthetic valve into the compartment 228 and to the retainer 230, compressing or crimping the valve until it fits inside the distal sheath 222, which holds the valve in a compressed state until the user decides to deploy the valve. When the valve 50 is later deployed by unsheathing, the stent portion 51 self-expands and is ultimately disengaged from the delivery device 210 once the retention members 54 are released from the retainer 230. If the valve 50 has not been fully deployed, i.e., if a portion of the valve remains in a collapsed state beneath the distal sheath 222, the valve may be resheathed by sliding the distal sheath back over the portion of the stent that has expanded, thereby recollapsing the expanded portion of the stent 51.

The operation of the delivery device 210 to deploy a prosthetic valve 50 into the apparatus 1 or 100 via the respective transfemoral inlet port 28 or 128 or into the apparatus 100 via the subclavian inlet port 129 will now be described. To use the delivery device 210 to deploy a prosthetic valve 50 that has been compressed and inserted in the compartment 228 and covered by the distal sheath 222, a user may insert the distal end 212 of the delivery device 210 into the transfemoral inlet port 28 or 128 or the subclavian inlet port 129 to deliver a collapsible prosthetic valve through the aortic arch 20 or 120 to the aortic annulus 30 or 130. The user may advance the delivery device 210 over a guide wire (not shown) to guide the distal end 214 of the delivery device 210 through the aortic arch 20 or 120, the aortic annulus 30 or 130, and into the left ventricle 10 or 110. The progress of the catheter assembly 214 through the apparatus 1 or 100 may be visualized using three-dimensional echocardiography, for example.

Once the valve portion 55 is located within the aortic annulus 30 or 130, a user can retract the distal sheath 222 proximally from the compartment 228, thereby exposing and initiating deployment of the valve 50 located therein. After the distal sheath 222 has been partially retracted from the compartment 228, the valve portion 55 of the prosthetic valve 50 may be fully exposed. At this point, the distal sheath 222 will not be fully withdrawn from the compartment 228, and the prosthetic valve 50 will not be fully deployed.

When the deployment procedure has reached this juncture, the user can evaluate the position of the valve 50 and determine whether the valve portion 55 is properly aligned relative to the aortic annulus 30 or 130. If repositioning is desired, the user may resheathe the valve 50 by moving the distal sheath 222 distally over the compartment 228 and the partially deployed valve and recollapsing the expanded valve portion 55 of the valve. With the valve 50 resheathed, the user can reposition the delivery device 210 and commence the deployment procedure once again.

Once the valve 50 has been properly positioned relative to the aortic annulus 30 or 130, the user may complete the deployment process. To do so, the user may fully retract the distal sheath 222 from the compartment 228. When the valve 50 is unsheathed, the stent portion of the valve 51 self-expands and is disengaged from the retainer 230, thereby releasing the valve from the catheter assembly 214. Further details of the structure and function of the delivery device 210 may be found in U.S. patent application Ser. No. 13/790,819, filed Mar. 8, 2013, the disclosure of which is hereby incorporated by reference herein.

Referring now to FIG. 4, an exemplary transfemoral delivery device 210' that may be used to deploy the collapsible prosthetic heart valve 50 into the apparatus 1 or 100 using the respective transapical inlet port 18 or 118 will be described. The delivery device 210' has a distal tip 212' and a catheter assembly 214' extending from the distal tip to a proximal end (not shown) that may include a handle (not shown) for a user to control the delivery device 210'.

The catheter assembly 214' may include a proximal sheath 220' extending from the handle towards the distal tip 212', a distal sheath 222' extending from the distal tip 212' towards the handle, a hollow tube 226' that extends slidably from the proximal end through the proximal sheath 220' and attaches to the distal tip 212' of the delivery device 210', and a valve receiving compartment 228' configured to receive a collapsible prosthetic valve, such as the valve 50 shown in FIG. 1C, for delivery into the apparatus 1 or 100.

The valve receiving compartment 228' includes a proximal conical end 231' at the distal end of the proximal sheath 220', a distal conical end 232' spaced from the proximal conical end, and a retainer 230' located, in this embodiment, adjacent the distal conical end 232' and inside the distal sheath 222'. A hollow inner shaft 224' is connected at one end to the proximal conical end 231' and at the other end to the distal conical end 232', and slidably receives the hollow tube 226' therethrough. For delivery into the apparatus 1 or 100, the collapsible valve 50 is loaded into the valve receiving compartment 228' around the inner shaft 224' and between the conical ends 231' and 232', and the stent portion 51 of the valve is coupled to the retainer 230'.

The retainer 230' may be the same as the retainer 230 shown and described above, but with a sufficient central bore extending longitudinally therethrough to permit the hollow tube 226' to be slidably received therethrough.

The operation of the transapical delivery device 210' to deploy a prosthetic valve 50 into the apparatus 1 or 100 via the respective transapical inlet port 18 or 118 is similar to the operation of the transfemoral delivery device 210 described above, except that the valve approaches the aortic annulus 30 or 130 from the left ventricle 10 or 110 rather than from the aortic arch 20 or 120.

To use the delivery device 210' to deploy a prosthetic valve 50 that has been compressed and inserted in the compartment 228' and covered by the distal sheath 222', a user may insert the distal tip 212' of the delivery device 210' into the transapical inlet port 18 or 118 to deliver a collapsible prosthetic valve through the left ventricle 10 or 110 to the aortic annulus 30 or 130.

Once the valve portion 55 is located within the aortic annulus 30 or 130, a user can advance the distal sheath 222' distally from the compartment 228', thereby exposing and initiating deployment of the valve 50 located therein. After the distal sheath 222' has been partially removed from the compartment 228', the valve portion 55 of the prosthetic valve 50 may be fully exposed.

Then, the user can evaluate the position of the valve 50 and determine whether the valve portion 55 is properly aligned relative to the aortic annulus 30 or 130. If repositioning is desired, the user may resheathe the valve 50 by moving the distal sheath 222' proximally over the compartment 228' and the partially deployed valve and recollapsing the expanded valve portion 55 of the valve.

Once the valve 50 has been properly positioned relative to the aortic annulus 30 or 130, the user may complete the deployment process by advancing the distal sheath 222' to fully uncover the compartment 228'. When the valve 50 is unsheathed, the stent portion 51 of the valve self-expands and is disengaged from the retainer 230', thereby releasing the valve from the catheter assembly 214'. Further details of the structure and function of the delivery device 210' may be found in U.S. patent application Ser. No. 13/790,819, filed Mar. 8, 2013, the disclosure of which is hereby incorporated by reference herein.

Regardless of whether a valve 50 is to be delivered into the apparatus 1 or 100 via the respective transfemoral inlet port 28 or 128 or the into the apparatus 1 or 100 via the subclavian inlet port 129 using a device such as the device 210 shown in FIG. 3, or into the apparatus 10 or 100 via the respective transapical inlet port 18 or 118 using a device such as the device 210' described below with respect to FIG. 4, the stent portion 51 of the valve 50 preferably is attached to the retainer 230, 230' by the retention members 54 protruding from the end of the stent that is opposite the end at which the valve is located (i.e., the retention members protrude from the aortic end of the stent). Preferably, the retention members 54 are positioned at the end of the valve 51 that is to be deployed last, i.e., the end of the valve that will be covered by the distal sheath 222, 222' the longest.

For example, in a transfemoral prosthetic aortic valve delivery device (e.g., the device 210 shown in FIG. 3), the retention edge 234 of the retainer 230 is located at the distal end thereof, and the distal sheath 222 is moved in a proximal direction to unsheathe and deploy the valve, with the distal end of the valve unsheathed first, which in this case is the valve portion 55. In a transapical prosthetic aortic valve delivery device (e.g., the device 210' shown in FIG. 4), the retention edge 234' of the retainer 230' is located at the proximal end thereof, and the distal sheath 222' is moved in a distal direction to unsheathe and deploy the valve, with the proximal end of the valve unsheathed first, which in this case is also the valve portion 55. Thus, in either one of the devices 210 or 210', the valve portion 55 of the valve 50 is preferably unsheathed first.

Although the invention herein has been described with reference to modeling of the aortic arch, the aortic annulus, and the left ventricle, the invention may be used to model other portions of a patient's cardiovascular system for other purposes, such as modeling a patient's carotid artery for delivery of a collapsible stent therein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

The invention claimed is:

1. An apparatus for simulation of an anatomical structure, the apparatus comprising: a left ventricle component having an inlet port configured to receive fluid flow therethrough; an aortic arch component having an outlet port configured to receive fluid flow therethrough; an aortic annulus component attached to and disposed between the left ventricle component and the aortic arch component, the aortic annulus component having an inner surface including simulated stenotic nodules, wherein the left ventricle component, the aortic annulus component, and the aortic arch component are portions of a cardiovascular structure; a lining comprising tissue of an animal overlying an inner surface of an outer wall of the cardiovascular structure; an introducer configured to receive an elongated catheter assembly therethrough, the introducer being in fluid communication with at least one of the left ventricle component and the aortic arch component; and a liquid pumping system in fluid communication with the inlet port of the left ventricle component and the outlet port of the aortic arch component, the liquid pumping system configured to provide high pressure liquid pulses into the inlet port of the left ventricle component and a back pressure into the outlet port of the aortic arch component, the back pressure being less than the high pressure pulses, wherein the liquid pumping system is a partially-closed recirculating liquid flow system including a vertically-oriented low-pressure chamber, an open liquid tank having a substantially constant pressure, a high-pressure chamber comprising a compliant tube, and a gas pulse generator.

2. The apparatus as claimed in claim 1, wherein the left ventricle component has an inner surface including topographical features configured to match the topography of an inner surface of a human left ventricle.

3. The apparatus as claimed in claim 1, wherein the aortic arch component has an inner surface including topographical features configured to match the topography of an inner surface of a human aortic arch.

4. The apparatus as claimed in claim 1, wherein the aortic annulus component is partially inserted into the aortic arch component.

5. The apparatus as claimed in claim 1, wherein the lining overlies the inner surface of the aortic annulus component, and the simulated stenotic nodules are attached to the inner surface of the outer wall and form bumps in the surface of the tissue lining, the simulated stenotic nodules being disposed between the lining and the inner surface of the outer wall.

6. The apparatus as claimed in claim 1, wherein the introducer is a first introducer in fluid communication with the left ventricle component, the apparatus further comprising a second introducer in fluid communication with the aortic arch component.

7. The apparatus as claimed in claim 6, wherein the aortic arch component has an inner surface including topographical features configured to match the topography of an inner surface of a human aortic arch, and the second introducer is located in a descending aorta portion of the aortic arch component, the apparatus further comprising a third introducer in fluid communication with the aortic arch component and located at a position within the aortic arch component at which a brachiocephalic artery portion of the aortic arch component intersects an ascending aorta portion of the aortic arch component.

* * * * *